United States Patent [19]

Sara

[11] Patent Number: 4,559,270

[45] Date of Patent: Dec. 17, 1985

[54] OXIDATION PROHIBITIVE COATINGS FOR CARBONACEOUS ARTICLES

[75] Inventor: Raymond V. Sara, Parma, Ohio

[73] Assignee: Union Carbide Corporation, Danbury, Conn.

[21] Appl. No.: 518,194

[22] Filed: Jul. 28, 1983

[51] Int. Cl.$^4$ .......................... B05D 3/02; B32B 9/00
[52] U.S. Cl. ................. 428/408; 249/114 R; 249/134; 427/376.2; 427/379; 427/397.8; 428/698; 501/5; 501/95; 501/128
[58] Field of Search ............. 427/113, 376.2, 379, 427/397.8; 428/408, 367, 689, 698; 313/355; 501/5, 95, 128; 249/114, 134

[56] References Cited

U.S. PATENT DOCUMENTS

| | | | |
|---|---|---|---|
| 3,140,193 | 7/1964 | Kane | 117/8 |
| 3,348,929 | 10/1967 | Valtschev et al. | 29/180 |
| 3,852,107 | 12/1974 | Lorkin et al. | 117/228 |
| 4,301,387 | 11/1981 | Schiffarth et al. | 313/355 |
| 4,384,046 | 5/1983 | Najagami | 501/95 |
| 4,418,097 | 11/1983 | Misra | 427/113 |

FOREIGN PATENT DOCUMENTS

| | | |
|---|---|---|
| 316450 | 11/1917 | Fed. Rep. of Germany . |
| 894593 | 4/1962 | United Kingdom . |
| 955629 | 4/1964 | United Kingdom . |

*Primary Examiner*—Michael R. Lusignan
*Attorney, Agent, or Firm*—John R. Doherty

[57] ABSTRACT

A carbonaceous article, e.g., a carbon or graphite crucible or mold, is provided with an oxidation prohibitive coating comprising a rigid, glassy, ceramic, refractory material containing mullite and silicon carbide or boron carbide or both. The carbonaceous article has a coefficient of thermal expansion which is greater than about $1.5 \times 10^{-6}$ inch/inch/°C.

27 Claims, No Drawings

OXIDATION PROHIBITIVE COATINGS FOR CARBONACEOUS ARTICLES

DESCRIPTION

1. Related Application

Copending application Ser. No. 518,192 entitled "Carbonaceous Articles Having Oxidation Prohibitive Coatings Thereon", filed by R. V. Sara on even date herewith, discloses and claims subject matter which is related to the present application.

2. Technical Field

The present invention relates to carbonaceous articles and more particularly to carbonaceous articles having oxidation prohibitive coatings thereon and to improved methods for applying such coatings onto the surfaces of carbonaceous articles. In a more specific aspect, the present invention is directed to improvements in oxidation protection of carbon or graphite articles having relatively high coefficients of thermal expansion (CTE), i.e., above about $1.5 \times 10^{-6}$ inch/inch/° C. Such articles include particularly graphite crucibles or molds for casting molten refractory materials, furnace lining brick and the like.

BACKGROUND ART

Carbonaceous articles are widely used today in both the chemical and metallurgical industries because they exhibit exceptional properties at high temperatures. For example, graphite crucibles or molds exhibit good mechanical strength and excellent thermal stability when subjected to high casting temperatures.

However, a major deficiency of carbonaceous articles is that they rapidly oxidize and erode at high temperatures, i.e., above about 500° C. This deficiency can be particularly troublesome in those instances where the articles must be periodically replaced as they are oxidized and consumed. The final cost of the product is therefore significantly increased.

It has already been proposed to employ oxidation prohibitive coatings on the surfaces of carbonaceous articles, such as carbon or graphite electrodes. These protective coatings have been composed of carbides, silicides, oxides and metals, for example. They have been applied to the articles using various known methods such as by electric arc, flame spraying, vacuum heating and the like.

U.S. Pat. No. 3,140,193 to Kane, for example, discloses a graphite electrode having a protective coating consisting of an inner layer made of porous silicon carbide and an outer layer composed of silicon metal. The inner layer is applied to the graphite by vacuum heating in a furnace at elevated temperatures. A problem with these coatings has been that they bond to the carbon or graphite substrate with difficulty and they are also expensive.

Thus, there is a need in this industry for improved oxidation prohibitive coatings for use on carbonaceous articles which avoid the difficulties of the prior art and provide very effective protection against oxidation even under severe or abusive conditions, and which are easy to apply, inexpensive and readily adaptable to full-scale production.

SUMMARY OF THE INVENTION

In accordance with the present invention, there is provided an article comprising a carbonaceous substrate and a coating overlying and bonded to the substrate, the coating comprising a rigid, glassy, ceramic, refractory material containing mullite and a metallic carbide selected from the group consisting of silicon carbide and boron carbide. The carbonaceous substrate, e.g. carbon or graphite, has a coefficient of thermal expansion (CTE) which is greater than about $1.5 \times 10^{-6}$ inch/inch/° C. The ceramic coating adheres or bonds exceptionally well to these relatively high CTE carbonaceous materials even after the article has been subjected to severe or abusive conditions such as thermal shock. The ceramic coating is most advantageously employed in conjunction with carbonaceous articles such as carbon or graphite crucibles or molds used in the casting of molten refractory materials, furnace lining brick and the like.

The present invention also comprehends an improved method of protecting a carbonaceous article having a relatively high coefficient of thermal expansion (CTE) against oxidation and erosion at elevated temperatures which comprises:

(a) applying to the surfaces of the carbonaceous article a particulate mixture containing mullite, silica, silicon carbide or boron carbide or both and a silicon-containing binder, e.g., sodium silicate; and (b) heating the particulate mixture to a temperature at which a rigid, glassy, ceramic, refractory coating is formed.

Preferably, the particulate mixture is applied to the carbonaceous article in the form of an aqueous slurry and then dried under conditions to produce a hard coherent layer adhering to the surfaces of the article. The coated article is then heated to an elevated temperature sufficient to cure the coating composition.

Mullite ($3Al_2O_3 \cdot 3SiO_2$) is a well known ceramic material. It is widely used for many applications in the ceramic industry. Mullite is commonly produced by heating clays, feldspar, hyanites, etc., to a temperature in excess of 1300° C. Methods for producing mullite are disclosed in U.S. Pat. Nos. 3,857,923 and 3,922,333, for example.

DESCRIPTION OF THE PREFERRED EMBODIMENT

The present invention is based upon the discovery that a rigid, glassy, ceramic, refractory coating containing silicon carbide or boron carbide or both and having a coefficient of thermal expansion (CTE) which approaches that of the carbonaceous article, i.e., above about $1.5 \times 10^{-6}$ inch/inch/° C., can be bonded to the surfaces of the carbonaceous article by applying thereto a particulate mixture containing mullite, silica, silicon carbide or boron carbide or both and a silicon-containing binder, e.g., sodium silicate, and then heating the mixture to an elevated temperature above about 1100° C. Since the coefficient of thermal expansion of the coating approaches that of the carbonaceous substrate, high internal stresses do not build up inside the coating due to differences in thermal expansion between the coating and the substrate. Consequently, there is less of a tendency for the coating to crack or even spall under severe or abusive conditions. Moreover, the ceramic coating is plastic and flowable at temperatures above about 1100° C. and is therefore able to seal off any tiny microcracks that may develop in the coating during its useful life.

In the practice of the present invention, a coating composition is prepared by admixing together particles of mullite, silica, silicon carbide or boron carbide or both and a silicon-containing binder material, e.g., sodium silicate. The coating composition comprises between about 20 and 70% by weight mullite, between about 5 and 14% by weight silica, between about 5 and 70% by weight silicon carbide or boron carbide or both and between about 5 and 14% by weight of the binder material, all percentages being based upon the total weight of the dry ingredients. A sufficient amount of water is added to the mixture to form a slurry of a consistency which will allow the coating composition to be uniformly applied to the surfaces of the carbonaceous article by brushing, spraying or the like.

The particle size of the various mixture ingredients used in the coating composition is not narrowly critical. Generally, the mullite and silica particles should be kept within a range of between about 5 and 350 microns, whereas the silicon carbide or boron carbide particles should be maintained within a range of between about 20 and 200 microns. A commercial grade silicon carbide powder of a size which is less than 74 microns is preferably employed.

The silicon-containing binder material is preferably sodium silicate as indicated, although other materials may be used such as potassium silicate, ethyl silicate and colloidal silica. The sodium silicate can be employed either as a dry powder or a liquid, e.g. waterglass.

The slurry is applied to the carbonaceous article using conventional methods such as by brushing or by spraying. Care should be taken to cover all of the surfaces to be protected with a relatively thick, moist uniform layer. The applied layer is then dried for a sufficient time to remove water and produce a hard coherent layer which adheres to the surfaces of the article. The layer may be dried suitably at room or ambient temperature for about one or two hours. The layer may also be dried under accelerated conditions at moderately elevated temperatures (e.g., 80° C.) in a drying oven, for example. If necessary, a second application of the slurry may be applied in the same manner to the dried, first applied layer in order to build up the thickness of the coating. Preferably, the thickness of the dry coating is in a range of between about 0.020 and 0.100 inch.

After drying has been complete, the coated article is then heated to an elevated temperature above about 1100° C. in order to cure the composition and form a rigid glassy ceramic coating. Optionally, the coating may be heated directly to curing temperature while simultaneously drying the applied layer. The coating adheres or bonds exceptionally well to the carbon or graphite substrate and is able to withstand severe thermal shock.

Typically, ceramic coatings for carbonaceous articles according to the present invention have a coefficient of thermal expansion of about $5.5 \times 10^{-6}$ inch/inch/° C. By comparison, high CTE graphite materials used to make casting molds and the like have coefficients of thermal expansion of about $4 \times 10^{-6}$ inch/inch/° C.

The present invention also provides a carbonaceous article having an uncured or "green" oxidation prohibitive coating on its surfaces. This uncured or green coating can be applied to the carbonaceous article in the same manner as described hereinabove using a coating composition with the same ingredients and proportions. However, in this case, the manufacturer would not bake or cure the coating at elevated temperatures before storage or shipment to the customer. The ceramic coating of the present invention is particularly well suited to such storage or shipment since the uncured, dried coating adheres very well to the carbonaceous substrate and is hard and very durable. As a precautionary measure, however, the uncured coating should not be exposed directly to the elements for prolonged periods since the coating before curing is water soluble.

The present invention also comprehends a novel and improved coating composition for use in protecting the surfaces of a carbonaceous article, e.g., carbon or graphite crucible or mold, against oxidation. The coating composition comprises between about 20 and 70% by weight mullite, between about 5 and 14% by weight silica, between about 5 and 70% by weight silicon carbide or boron carbide or both and between about 5 and 14% by weight of the binder, e.g., sodium silicate, all percentages being based upon the total weight of the dry ingredients. The coating composition may be advantageously applied to the surfaces of the carbonaceous article in the form of a wet paste by brushing, trowling or a similar technique. Alternatively, the coating composition may be applied to the surfaces of the carbonaceous article by spraying or dipping, for example. In these cases, additional water is added to the coating composition as required to adjust its consistency to the desired level.

In the preferred practice of the present invention, the coating composition comprises between about 48 and 60% by weight mullite, between about 9 and 12% by weight silica, between about 16 and 35% by weight silicon carbide and between about 8 and 11% by weight of the sodium silicate binder, all percentages being based upon the total weight of the dry ingredients.

Other ingredients may also be used in the coating composition to adjust or modify its physical properties. For example, the thermal expansion of the coating can be lowered by adding low expanding constituents like fused $SiO_2$, graphite, $Si_3N_4$, etc. Glazing can be enhanced with borates, and low temperature oxidation protection improved by addition of Al and Ti. These metallic additions also increase the electrical conductivity of the coating. Metallic, inorganic or carbonaceous fibers can also be added to the coating composition to improve strength.

The following examples will serve to further illustrate the practice of the present invention.

EXAMPLE 1

A slurry was prepared using a commercial refractory cement containing mullite ($3Al_2O_3.2SiO_2$) and silica ($SiO_2$) produced under the tradename "Super 3000", a product of C. E. Refractories, Combusition Engineering, Inc., Valley Forge, PA. The cement had the following composition: approximately 57.0% by weight mullite, 11.4% by weight silica, and 31.6% waterglass. This composition as published by the manufacturer was calculated on the basis of a chemical analysis of the cement by ASTM C-753, which analysis comprises 52.2% by weight $Al_2O_3$, 44% by weight $SiO_2$, 0.2% $Fe_2O_3$ and 3.6% by weight alkali (as $Na_2O$). The waterglass is a 33.4% by weight solution of sodium silicate in the approximate form $Na_2O\ 3.8SiO_2$. Waterglass can also be expressed as 10.6 weight % $Na_2O.3.8SiO_2$ and 21 weight % water based upon the total weight of the cement. Silicon carbide powder was added to the cement in an amount of about 20% by weight based on the total weight of the cement to form the slurry. The final composition of the slurry was: 47.4% by weight mullite, 9.4% by weight silica, 26.1% by weight waterglass, and 16.7% by weight silicon carbide. The waterglass could be expressed at 8.7% by weight $Na_2O.3.8SiO_2$ and 17.4% by weight water, based upon the total weight of the slurry. On a water-free basis, the dry ingredients had the following composition: 57.7% by weight mullite, 11.4% by weight silica, 20.3% by weight silicon carbide and 10.6% by weight sodium sodium silicate solids as $Na_2O.3.8SiO_2$. The silicon carbide used in the slurry was a commercial SiC powder, i.e., grade 280 RA Silicon Carbide, Carborundum Company, Niagara Falls, N.Y. The silicon carbide powders were of a size predominantly less than 74 microns.

A block of isotropic graphite measuring 3.1 ×4.3×6.8 inches was coated by brushing the slurry onto all but one side of the block. The applied slurry was then allowed to dry in air at room temperature until all the water had been removed. A second application of the slurry was then brushed onto the dried first layer and was dried in air at room temperature layer in the same manner as described. The coating bonded extremely well to the graphite block and had an overall thickness of about 0.080 inch.

The coated block was then placed inside a Globar furnace with its uncoated side resting on a ceramic insulating brick. The coated block was then heated to 1350° C. Air was purged through the furnace chamber at 7.5 SCFM during the oxidation test. After six hours, the coated brick was quenched by pulling it from the furnace and allowing it to stand at ambient temperature. It was found that oxidation of the brick occurred on the uncoated side but no oxidation occurred on the five coated sides of the brick. Furthermore, quenching from 1350° C. did not rupture the coating-graphite bond. This excellent result was attributed to the similar thermal contracting coefficients of both the coating and graphite brick.

EXAMPLE 2

A brick measuring 3×4×8 inches was shaped from a coal-base carbon block and coated with two applications using the slurry prepared in Example 1. The slurry contained the same ingredients and proportions of mullite, silica, silicon carbide and waterglass and was prepared in exactly the same manner. The coal-base material is commonly used to line aluminum reduction cells. The two applications were applied to the brick in the same manner allowing the first application to dry completely in air in order to remove water before applying of the second application. The coated brick was then placed inside an oxidizing furnace along with uncoated bricks made from the same graphite material and heated for seven days at a temperature of about 550° C. The coated brick was about 20% oxidized whereas the uncoated brick was completely oxidized.

In other examples, a number of standard graphite electrode samples having relatively low coefficients of thermal expansion (CTE) were coated with a slurry prepared as in Example 1 and were then subjected to oxidation tests. Although some of the coated electrode samples did successfully withstand thermal shock, in most cases, the coating did not bond well to the graphite, it cracked and spalled during cool-down to room temperature.

Although the present invention has been described herein with particular regard to a number of specific embodiments, it will be apparent to those skilled in the art that other variations and modifications may be made within the spirit and scope of the invention.

I claim:

1. An article comprising a carbonaceous substrate having a coefficient of thermal expansion greater than about $1.5\times10^{-6}$ inch/inch/° C. and an oxidation prohibitive coating overlying and bonded to said substrate, said coating comprising a rigid, glossy, ceramic, refractory material containing mullite as a major ingredient along with a metallic carbide selected from the group consisting of silicon carbide and boron carbide and mixtures thereof.

2. An article according to claim 1 wherein said carbonaceous substrate has a coefficient of thermal expansion of about $4\times10^{-6}$ inch/inch/° C.

3. An article according to claim 2 wherein said coating has a coefficient of thermal expansion of about $5.5\times10^{-6}$ inch/inch/° C.

4. An article comprising a carbonaceous substrate having a coefficient of thermal expansion of about $4\times10^{-6}$ inch/inch/° C. and an oxidation prohibitive coating overlying and bonded to said substrate, said coating comprising a rigid, glossy, ceramic, refractory material containing mullite as a major ingredient along with a metallic carbide selected from the group consisting of silicon carbide and boron carbide, said coating having a coefficient of thermal expansion of about $5.5\times10^{-6}$ inch/inch/° C. and being plastic and flowable at a temperature above about 1100° C.

5. A graphite crucible or mold having a coating according to any one of claims 1 to 4.

6. A furnace lining brick having a coating according to anyone of claims 1 to 4.

7. An article comprising a carbonaceous substrate having an oxidation prohibitive coating thereon which can be rendered resistant to thermal shock upon heating to elevated temperature above about 1100° C., said coating comprising between about 20 and 70% by weight mullite, between about 5 and 14% by weight silica, between about 5 and 70% by weight silicon carbide or boron carbide or both and between about 5 and 14% by weight of a silicon-containing binder material, all percentages being based upon the total weight of the dry ingredients.

8. An article according to claim 7 wherein said carbonaceous substrate has a coefficient of thermal expansion which is greater than about $1.5\times10^{-6}$ inch/inch/° C.

9. An article according to claim 7 wherein said silicon-containing binder material is selected from the group consisting of sodium silicate, potassium silicate, ethyl silicate and colloidal silica.

10. An article according to claim 7 wherein said coating comprises about 57.7% by weight mullite, about 11.4% by weight silica, about 20.3% by weight silicon carbide and about 10.6% by weight sodium silicate.

11. An article comprising a carbonaceous substrate having a coefficient of thermal expansion of about $4\times10^{-6}$ inch/inch/° C. and having an oxidation prohibitive coating thereon which can be rendered resistant to thermal shock upon heating to elevated temperature above about 1100° C., said coating comprising between about 48 and 60% by weight mullite, between about 9 and 12% by weight silica, between about 16 and 35% by weight silicon carbide and between about 8 an 11% by weight of sodium silicate, all percentages being based upon the total weight of the dry ingredients.

12. A graphite crucible or mold having a coating according to any one of claims 7 to 11.

13. A graphite furnace lining brick having a coating according to any one of claims 7 to 11.

14. A coating composition for applying an oxidation prohibitive coating onto a carbonaceous substrate, which comprises between about 20 and 70% by weight mullite, between about 5 and 14% by weight silica, between about 5 and 70% by weight silicon carbide or boron carbide or both and between about 5 and 14% by weight of a silicon-containing binder material, all percentages being based upon the total weight of the dry ingredients.

15. A coating composition according to claim 14 wherein said silicon-containing binder material is selected from the group consisting of sodium silicate, potassium silicate, ethyl silicate, and colloidal silica.

16. A coating composition according to claim 15 comprising about 47.4% by weight mullite, about 9.4% by weight silica, about 16.7% by weight silicon carbide and about 26.1% by weight sodium silicate.

17. A coating composition for applying an oxidation prohibitive coating onto a carbonaceous substrate, which comprises between about 48 and 60% by weight mullite, between about 9 and 12% by weight silica, between about 16 and 35% by weight silicon carbide and between about 8 and 11% by weight sodium silicate, all percentages being based upon the total weight of the dry ingredients.

18. A method of protecting a carbonaceous article against oxidation and erosion at elevated temperature above about 1100° C., which comprises:
(a) applying to the surfaces of said carbonaceous article a particulate mixture comprising between about 20 and 70% by weight mullite, between about 5 and 14% by weight silica, between about 5 and 70% by weight of a metallic carbide selected from the group consisting of silicon carbide and boron carbide, and between about 5 and 14% by weight of a silicon-containing binder material, all pecentages being based upon the total weight of the dry ingredients; and
(b) heating said particulate mixture to a temperature at which a rigid, glassy, ceramic, refractory coating is formed.

19. A method according to claim 18 wherein said carbonaceous article has a coefficient of thermal expansion which is greater than about $1.5 \times 10^{-6}$ inch/inch/° C.

20. A method according to claim 18 wherein said silicon-containing binder material is selected from the group consisting of sodium silicate, potassium silicate, ethyl silicate and colloidal silica.

21. A method according to claim 18 wherein said particulate mixture comprises about 47.4% by weight mullite, about 9.4% by weight silica, about 16.7% by weight silicon carbide and about 26.1% by weight sodium silicate.

22. A method according to claim 18 wherein said particulate mixture is applied to the surfaces of said carbonaceous article in the form of an aqueous slurry.

23. A method according to claim 22 wherein said slurry is dried under conditions to produce a hard coherent layer adhering to the carbonaceous article.

24. A method according to claim 23 wherein said slurry is dried in air at ambient temperature.

25. A method according to claim 24 wherein said dried coherent layer is heated to temperature of at least about 1100° C.

26. A method of protecting a carbonaceous article having a coefficient of thermal expansion of about $4 \times 10^{-6}$ inch/inch/° C. against oxidation and erosion at elevated temperature above about 1100° C. which comprises:
(a) applying to the surfaces of said carbonaceous article an aqueous slurry comprising between about 48 and 60% by weight mullite, between about 9 and 12% by weight silica, between about 16 and 35% by weight silicon carbide and between about 8 and 11% by weight sodium silicate, all percentages being based upon the total weight of the dry ingredients;
(b) drying said slurry in air at room temperature to remove water and to form a hard coherent layer adhering to the surfaces of said article; and
(c) heating said dried coherent layer to a temperature of at least about 1100° C. to thereby form a rigid, glassy, ceramic, refractory coating.

27. In an article comprising a carbonaceous substrate having a coefficient of thermal expansion greater than about $1.5 \times 10^{-6}$ inch/inch/° C. and an oxidation prohibitive coating on at least one surface thereof; the improvement wherein said coating comprises a layer of rigid, glassy, ceramic, refractory material overlying and bonded to the surface of said substrate, said refractory material containing mullite having a composition consisting essentially of $3Al_2O_3.3SiO_2$ as a major ingredient along with a metallic carbide selected from the group consisting of silicon carbide and boron carbide, said layer being plastic and flowable at a temperature above about 1100° C.

* * * * *